INVENTOR
John G. Gievers.
BY Harness and Harris
ATTORNEYS

United States Patent Office 2,950,428
Patented Aug. 23, 1960

2,950,428

ANGULAR POSITION CONTROL SERVOSYSTEM ELECTRO-OPTICAL DATA TRANSMISSION

John G. Gievers, Rochester, Mich., assignor to Chrysler Corporation, Highland Park, Mich., a corporation of Delaware Filed Dec. 12, 1957, Ser. No. 702,478

24 Claims. (Cl. 318—28)

This invention relates to a method and electro-optical apparatus for monitoring the positions of one or more stabilized platforms, as for example a naval vessel's gyro-stabilized missile launching platforms, so as to maintain the several platforms in predetermined alignment with respect to each other or a rigid reference portion of the ship.

One of the problems that must be considered in the fire control of a missile from shipboard is the displacement between the reference axis of the Ship's Inertial Navigation System (SINS) and the stable platform of the missile. When the ship is moving at an angle into a strong current or is subject to a temperature gradient between its opposite sides, the reference axis is often deflected, so that an error is introduced. Inasmuch as the angular deflection or error cannot be detected by the SINS unit, a means of recognizing and compensating for the error must be found in order to obtain the required accuracy for fire control of the missile.

Because of the blurring of optical images caused by vibrations in a vehicle under way, it is usually difficult or impossible on board ship or aircraft to read an optical instrument such as auto-collimator sufficiently accurately to measure the ship's flexure to an accuracy in the order of seconds of arc. It is therefore an important object of the present invention to provide an improved electro-optical scanner and data transmission system which overcomes the above-mentioned blurring effects.

Another object is to provide an improved electro-optical data transmission system in conjunction with a servo mechanism for use on ship board to achieve automatic monitoring and adjustment of gyro-stabilized platforms.

Although many optical scanning systems are known to the art, a common characteristic of such systems which limits their use in applications of the type illustrated herein is that the relationship between the angle of deflection of the detecting instrument, such as a microampmeter, must be very symmetrical with respect to the zero or reference point of the angle of deviation to be measured in the optical system. Such symmetry is difficult to obtain and introduces error which results in shifting of the zero or reference point of the detecting instrument or microampmeter with increasing amplitude of the ambient shipboard vibrations. The foregoing is partcularly true where the amplitude of vibrations of a ship under way are as much as 200 to 300 times as large as the angular deviation or flexure of the ship to be measured. Also photocells and light sources commonly used in electro-optical scanner systems are not particularly stable and are sources of error as commonly employed.

It is accordingly another object to provide an improved electro-optical scanning system of the above character which is independent of the amplitude of ambient vibrations and which operates in accordance with a phase shift between two or more sources of electrical or light pulses and is thus independent of both the light intensity and the characteristics of photocells employed in the circuit, thereby to avoid the calibration problems inherent in conventional systems.

Another and more specific object is to provide an electro-optical scanner system for shipboard use in monitoring the positions of gyro-stabilized platforms, wherein each platform is equipped with a mirror adapted to receive light pulses through a long narrow light path from a reference source and to reflect the pulses to a photoelectric cell. Angular deflection of each mirror is detected by the resulting shift in phase of the light pulses reflected to the photoelectric cell, which phase shift is measured by being compared with a reference pulse in order to determine the magnitude of the angular deflection of the mirror.

When the alignment of small and complicated gyro-stabilized platforms must be monitored, it is often difficult to locate the scanning mechanism on the platform. It is therefore another object to provide a scanner system of the foregoing character comprising an additional optical set, wherein the bulk of the weight of the scanning mechanism is feasibly supported on a rigid portion of the ship, and a small mirror only is mounted on each platform.

Other objects of this invention will appear in the following description and appended claims, reference being had to the accompanying drawings forming a part of this specification wherein like reference characters designate corresponding parts in the several views.

Figure 7 is a view similar to Figure 6 illustrating an application of the invention for monitorng a number of platforms with respect to a single master platform.

Figure 8 is a schematic view illustrating another modification wherein the electro-optical scanner is employed to maintain a reference base line by which the ship's flexure is monitored.

It is to be understood that the invention is not limited in its application to the details of constructon and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, the basic optical arrangement is substantially the same in all views and is similar to the optical system normally employed in auto-collimators.

Figures 1, 2:
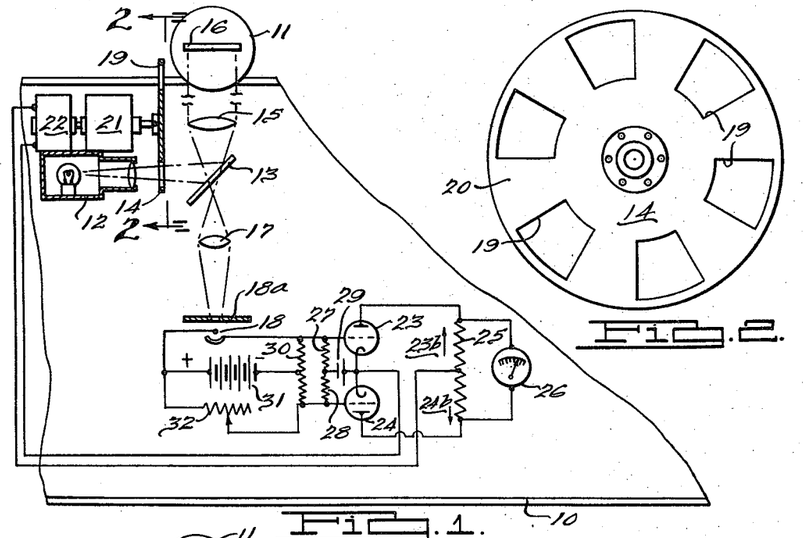
Figure 1 is a schematic view showing one embodment of the present invention wherein the phase shift of light pulses is measured with respect to standard electrical pulses generated by an alternator.
Figure 2 is an enlarged elevational view of the scanning disc shown in Figure 1, taken in the direction of the arrows along the line 2—2 of Figure 1.
Figure 2:
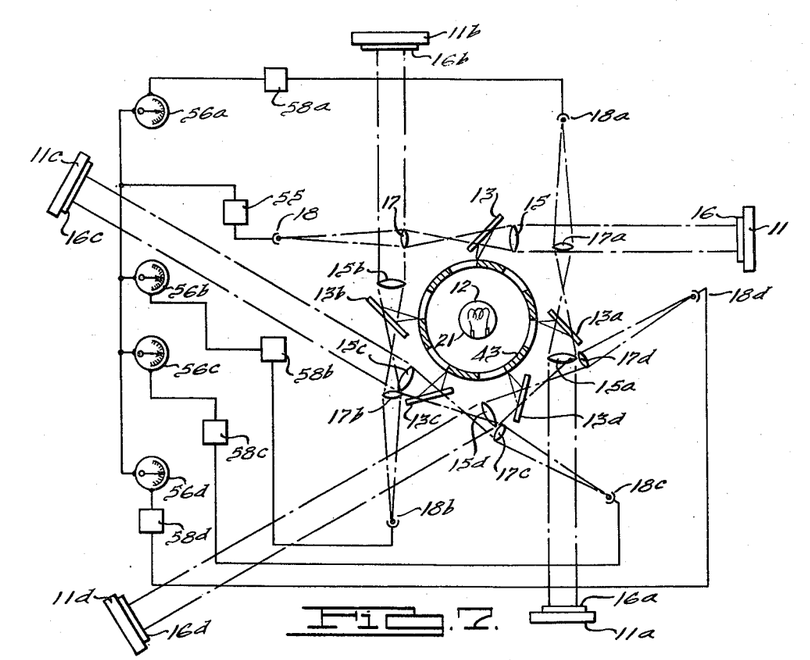

In Figure 1, a rigid or fixed portion of a missile launching ship is indicated by the numeral 10 and a gyro-stabilized platform on the ship is indicated at 11. In this instance, the scanning mechanism is mounted on the ship's structure 10 and comprises a light source 12 which directs a lightbeam toward a semi-reflecting mirror 13 through an interrupter or scanning disc 14, Figure 2. Light from the mirror 13 is reflected through a collimating lens 15 from which a beam of parallel rays is directed to a mirror 16 rigidly mounted on platform 11. From the mirror 16, the collimated rays are returned through lens 15 and semi-reflector 13 to a magnifying lens 17 which focuses the light beam on the cathode of photoelectric cell 18. A small opening in an opaque shield 18a in front of cell 18 minimizes the influence of ambient light thereon.

In order to supply a pulsating light signal to the photoelectric cell 18, the peripheral portion of the disc 14 is provided with a number of openings 19 spaced by opaque portions 20 of the disc, the circumferential dimensions of the openings 19 and opaque portions 20 being the same in the present instance. The light source 12 is arranged to direct its light beam through the central portions of the openings 19 at the lower portion of the disc on its vertical midline as the latter is rotated by means of motor 21. As will be apparent from the following, the phase shift of light pulses from the source 12 resulting from angular deviation of mirror 16 about an axis normal to the plane of Figure 1 can also be measured if the light source is arranged to direct its beam through the openings 19 at a location above the axis of the disc 14 diametrically opposed to the location shown.

Also driven by motor 21 is an electrical oscillator or pulse generator 22 designed to transmit alternating electrical pulses to a discriminating circuit at the same frequency that the light pulses are transmitted by the interrupter 14. The discriminating circuit comprises triode vacuum tubes 23 and 24, potential divider or resistance 25 and a highly damped direct current microampmeter 26 connected in parallel across the anodes of tubes 23 and 24, and grid resistors 27 and 28. One end of each of the resistors 27 and 28 is connected to one of each of the grids of tubes 23 and 24 respectively, and also to one of each of the opposite ends of resistance 30 in a bridge circuit containing photoelectric cell 18. Electrical potential means 29 is illustrated schematically connecting the opposite ends of the resistors 27 and 28 to the cathodes of tubes 23 and 24 for the purpose of applying a negative potential bias at the grid of tube 23 to prevent plate conduction in the latter tube when no light is energizing cell 18. A source of electric potential 31 has its negative terminal connected to the mid-point of resistance 30 and has its positive terminal connected to the anode of cell 18. Variable resistance 32 enables adjustment of the bridge and is connected between the positive terminal of potential source 31 and the grid of tube 24 to provide a positive potential bias therefor when no light is energizing cell 18. The two leads from alternator 22 are connected respectively to the mid-point of resistance 25 and to the cathodes of tubes 23 and 24.

Figure 3:
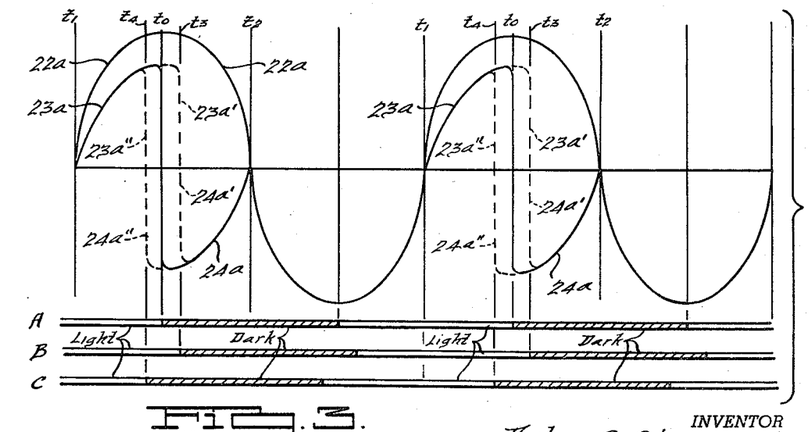
Figure 3 is a diagram illustrating the time relationship between the light pulses and the pulses from the generator or alternator.

It is apparent from the circuit shown that when no light is falling on cell 18, the grid of tube 23 normally has a negative bias, whereas the grid of tube 24 normally has a positive bias. Thus when a positive potential pulse is applied at the anodes of tubes 23 and 24, only the latter tube will conduct. When light falls on the cathode of cell 18, the latter's resistance is diminished to apply the positive potential of source 31 at the grid of tube 23, enabling the latter tube to conduct whenever a positive potential pulse is applied at the anodes of tubes 23 and 24. In such a case, plate conduction of tube 23 raises the cathode potential of tube 24 sufficiently to block plate conduction of tube 24. Accordingly as illustrated in Figure 3, plate current 23a flows in the direction of arrows 23b (Figure 1) through resistance 25 when a light pulse falls on cell 18 at the same time that a positive pulse from alternator 22 is applied to the resistance 25. Plate current 24a flows in the direction of arrow 24b when no light pulse is applied to cell 18 and the positive alternator pulse is applied as before. When the negative alternator pulse is applied to the potential divider 25, no current will flow in either tube 23 or 24. The circuit is suitably balanced so that when the plane of mirror 16 is normal to the optical axis, the alternate and oppositely directed currents 23a and 24a through resistance 25 will result in a zero reading of the ampmeter 26, which is damped to respond only to the average current in resistance 25, rather than to the equally and oppositely directed alternating currents 23a and 24a.

In the present instance, when mirror 16 is in its reference or zero position normal to the axis of the optical system, the maxima and minima of the generator or alternator potential 22a are applied so as to coincide with the changes from light to dark at cell 18, note light-dark sequence A, Figure 3, which give rise to the plate currents 23a and 24a. Thus during the quarter cycle between $t_1$ and $t_0$ when a positive potential 22a is applied by generator 22 to resistance 25, plate current 23a will flow through tube 23 because cell 18 is also energized by light from mirror 16. During the second quarter cycle, plate current 24a will flow in tube 24 from time $t_0$ to time $t_2$. During the remaining half cycle when the negative alternator pulse is applied to resistance 25, no current will flow in either tube 23 or 24.

In the event that mirror 16 should be deflected slightly from the position of perpendicularity to the optical axis, the light pulses directed to photocell 18 will either lead or lag with respect to the reference pulses from generator 22. Assuming now that the mirror 16 is deflected slightly so that the change from light to dark will lag with respect to the maximum and minimum reference potentials, note light-dark sequence B, Figure 3, plate current 23a will continue along the dotted line 23a' to time $t_3$ so that the total plate current 23a will extend from time $t_1$ to time $t_3$. As a corollary, the duration of the plate current 24a will be shortened from time $t_3$ to time $t_2$ as indicated by the dotted line 24a' at the lower portion of Figure 3. In consequence, the average current flow through resistance 25 will be dominated by the plate current 23a and the microampmeter 26 will indicate this changed average current.

It is also apparent that if mirror 16 is deflected oppositely so that the change from light to dark should slightly lead the peak reference potentials, note light-dark sequence C, Figure 3, the duration of the plate current 23a will be shortened along dotted line 23a'' from $t_1$ to $t_4$, and the duration of plate current 24a will be lengthened along dotted line 24a'' from $t_4$ to $t_2$, whereby the average current in resistance 25 will be dominated by the plate current 24a and the resulting change in average current will be indicated by the ampmeter 25. It will also be apparent from the foregoing that vibrations of the ship causing deflections of mirror 16 at the normally encountered frequencies, which are usually much smaller than the frequency of the light pulses transmitted by disc 14, will be damped by meter 26 and will have no influence on its reading.

A scanning disc 14 having twelve windows or openings 19 spaced by equally dimensioned opaque portions 20 of the disc has been employed satisfactorily at a rotational speed of 1800 r.p.m., resulting in a pulse frequency of 360 cycles per second. Where desired, the speed of rotation may be increased, or more windows may be employed. Increasing the pulse frequency, however, changes the relation between the angular motion of the reflecting mirror 16 and the phase shift. In the preferred scanner, both the width of the windows and the separations between were ¼". At the pulse frequency of 360 cycles per second, a plus or minus 90° phase shift resulted when the reflecting mirror 16 rotated plus or minus 15 minutes of arc. In consequence, the scanner was able to average out ambient shipboard vibrations having a maximum amplitude of plus or minus 15 minutes of arc. If the light pulse frequency is doubled, the angular deflection of the mirror 16 will be reduced to plus or minus 7½ minutes of arc for a 90° phase shift. The foregoing calculations assume of course that the field of view of the optical system is large enough to accommodate the maximum deflection. Measurement to an accuracy of better than one second of arc is readily feasible and is adequate for ordinary purposes, although even this accuracy can be readily increased by increasing the gain and sensitivity of the electrical amplifiers. In this regard, it will be clear to those skilled in the electrical and electronic arts that the circuits shown are diagrammatic and are provided merely to illustrate the operation of the invention. Many well known types of more refined and sophisticated circuits can be employed to detect and measure the phase differential between the two sets of pulses.

Figure 4:
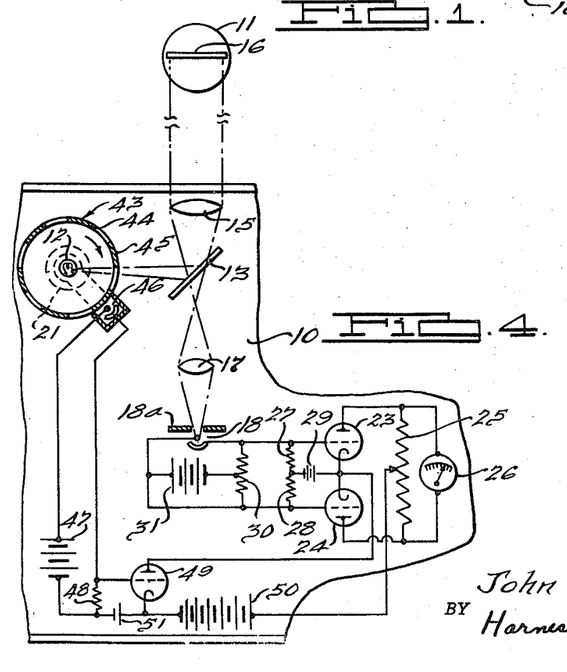
Figure 4 is a view similar to Figure 1, showing a modification wherein a light source and interrupter supply the standard pulses.

Referring to Figure 4, an arrangement similar to that of Figure 1 is illustrated wherein a cylindrical drum-type interrupter 43 having alternate slits 44 and ribs 45 is provided to supply the light pulses which are directed from source 12 within the drum 43 to the beam divider or semi-reflecting mirror 13, thence through the collimator 15 to mirror 16 and back to photoelectric cell 18 via focusing lens 17 as described above. In this situation, a second photoelectric cell 46 is arranged adjacent the drum 43 to receive light pulses therefrom and to supplant the alternator 22 of Figure 1 as a source of the reference potential. Cell 46 is energized by potential source 47 having its negative terminal connected through resistance 48 to the grid of amplifying tube 49. The latter tube is energized by potential source 50 having its positive terminal connected to the mid-point of potential divider 25. The anode of tube 49 is connected to the cathodes of tubes 23 and 24. A suitable potential source diagrammatically shown at 51 applies a negative bias to the grid of tube 49 to prevent plate conduction in the latter tube until cell 46 is energized by a predetermined light pulse from source 12.

As in Figure 1, tubes 23 and 24 are arranged in a flip-flop circuit. However, by virtue of potential source 50, one or the other of tubes 23 and 24 will always be conducting, depending upon whether cell 18 is energized or deenergized, as explained above. The system is balanced, so that neglecting the effect of tube 49, the alternate conduction of tubes 23 and 24 will result in equal and oppositely directed currents in resistance 25. The damped meter 16 will accordingly indicate a zero average current.

Cell 46 is arranged to receive its maximum and minimum light from source 12 in synchronism with the changes from dark to light and from light to dark respectively at cell 18 when mirror 16 is at its reference or zero position normal to the axis of the optical system. Thus the maximum plate conduction of tube 49 is similarly synchronized with the changes in conduction of tubes 23 and 24. When tube 49 is conducting, the plate current in the simultaneously conducting tube 23 or 24 will be increased to an optimum, but when mirror 16 is at its reference position, the alternating optimum currents in resistance 25 resulting from the alternate conduction of tubes 23 and 24 will be of equal values and will result in a zero average current in meter 26.

When the platform 11 containing mirror 16 is rotated about its vertical axis with respect to the ship's rigid portion 10 in such a direction that the light pulses reflected to photocell 18 slightly lag with respect to the reference pulses at cell 46, the duration of the optimum plate current 24a in potential divider 25 (resulting from conduction of tube 49) will be reduced and the duration of the optimum plate current 23a will be correspondingly increased, substantially as described in regard to Figure 1. Microampmeter 26 will indicate the change in phase. Similarly when the light pulses received by photocell 18 lead with respect to the reference pulses, the duration of the optimum plate current 24a will be increased, the duration of the optimum plate current 23a will be decreased, and the resulting phase change will be detected by the microampmeter 26.

An advantage of the foregoing arrangement over that shown in Figure 1 is that the vertical edges of the slits in the drum 43 which give rise to the light pulse energizing photocell 46 will result in a substantially square wave reference potential rather than the sinusoidal wave of Figure 3. Inasmuch as the zero or mid-point of the reference pulse is synchronized with the change from light to dark at cell 18, the characteristic of the phase shift signal given by plate currents 23a and 24a will be both linear and symmetrical with respect to said zero point.

In consequence of the utilization of the phase shift between light pulses reflected by the measuring mirror 16 and an alternating reference potential, the amplitude of the light pulse does not affect the accuracy of the measurements. Instability of the photocells and changes in the light intensity resulting either in the light source or in consequence of loss of light in the optical channel will not affect the accuracy of the measurements and toilsome calibration of the system is avoided. It is only important that the voltage of the reference potential be symmetrical abouts its zero point, which symmetry is readily obtainable.

Figures 5, 6:
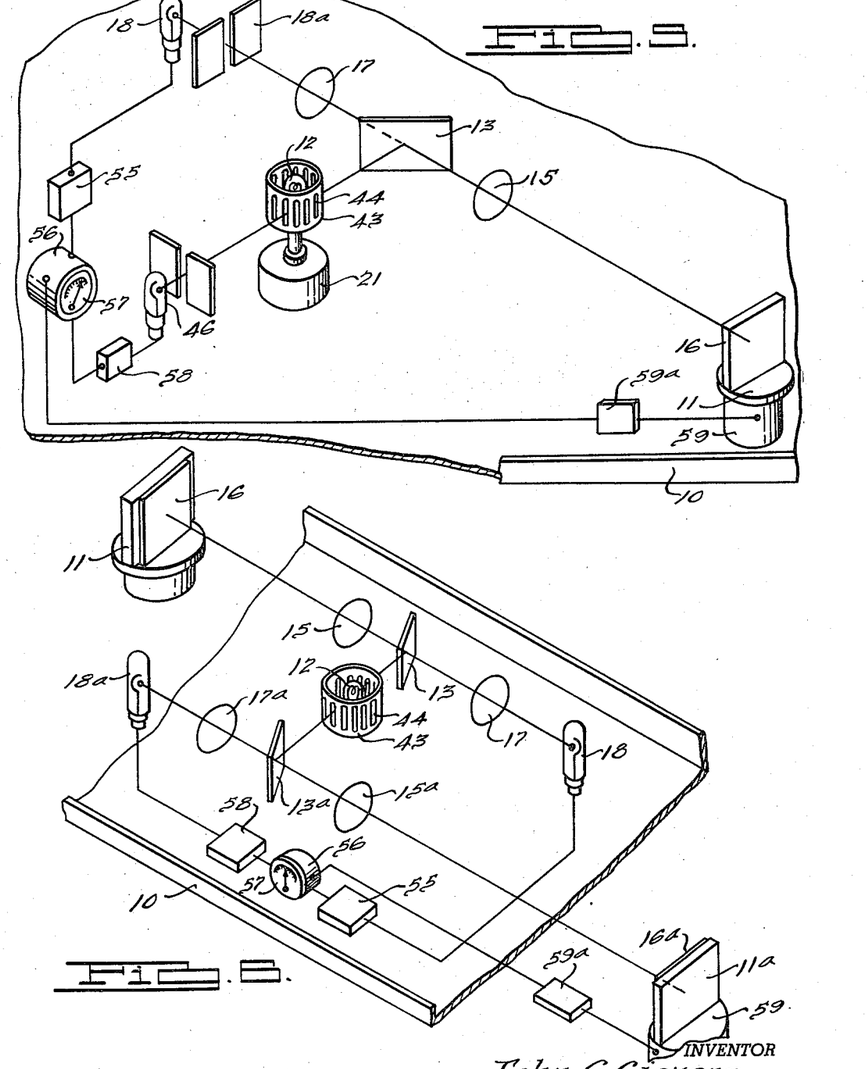
Figure 5 is a schematic view illustrating another embodiment of the invention employing a phase meter to measure the phase differential and also to effect automatic adjustment of the angle of the platform being monitored.
Figure 6 is a view similar to Figure 5 showing still another modification for monitoring the position of one platform with respect to a master platform which operates independently of the angular position of the scanner itself, so that the latter is mounted on a rigid portion of the ship.

Figure 5 illustrates an electro-optical scanner system having essentially the same optical system mounted on a rigid portion 10 of the ship as illustrated in Figures 1 and 4, comprising in this instance a slotted drum 43 and light source 12, whereby the light pulses to be measured are transmitted to the semi-reflecting mirror or beam divider 13, thence through collimating lens 15 to mirror 16 on stabilized gyro-platform 11. From mirror 16 light is reflected back through beam divider 13 and is focused on the cathode of photocell 18 by lens 17. As schematically illustrated in Figure 5, the intermittent pulses energizing cell 18 are transmitted via coupling amplifier 55 to a suitable phase detecting device 56, which may be similar to the microampmeter 26 or any one of numerous types of phase meters known to the art. The phase meter 56 is provided with an indicating dial 57 if desired. Also from light source 12 a reference pulse is transmitted through the slits 44 of the drum 43 to photocell 46, which converts the light pulses to electrical pulses as before and transmits the same via coupling amplifier 58 to phase meter 56. The phase meter 56 may be any one of numerous well known types of instruments suitable for detecting and measuring the phase differential between the pulses from cells 18 and 18a and is accordingly not described in detail. It is sufficient to note that the phase meter 56, similarly to the microampmeter 26, must be highly damped to prevent response to reference pulses or ambient vibrations of the reflecting mirror 16.

In order that operation of the phase meter 56 will be independent of the pulse voltage, which will vary with the intensity of the light, the output voltages of amplifiers 55 and 58 is stabilized by any one of numerous methods well known to the art. Also where it is desirable to render adjustments of the bench marks for platform 11 automatic, the phase meter 56 is suitably connected via amplifier 59a to a servo motor 59, which in turn is mechanically connected with the platform 11 to adjust the angular position of the latter in accordance with the phase differential detected by meter 56.

Figure 6 illustrates a modification where two gyro-stabilized platforms to be maintained in alignment are assumed to be too small to support the optical scanner. In this situation, mirrors 16 and 16a are mounted on platforms 11 and 11a respectively and are maintained in alignment with respect to each other by the scanner system mounted on a rigid portion 10 of the ship's body. In this situation, an additional optical system comprising a semi-reflector beam divider 13a collimating lens 15a, and focusing lens 17a are associated with photocell 18a, which are similar in construction and operation to their counterparts 13, 15, 17, and 18 respectively. Light from source 12 is reflected through the slits 44 of the drum as before to the beam dividers 13 and 13a, thence through their associated collimating lenses 15 and 15a to the mirrors 16 and 16a and back through focusing lenses 17 and 17a to the associated photocells 18 and 18a as described above. The electrical pulses from cells 18 and 18a are transmitted via amplifiers 55 and 58 to the windings of phase meter 56, which measures the phase difference between the pulses received from mirrors 16 and 16a. In this situation, mirror 16 may be considered a master which monitors or controls the deviation of mirror 16a. Also similarly to the automatic servo mechanism illustrated in Figure 5, the phase differential signal detected by the phase meter 56 can be fed back to the servo motor 59 coupled with platform 11a for automatically maintaining alignment between the mirrors 16 and 16a.

It is to be noted in regard to Figure 6 that angular deflection of the rigid portion 10 of the ship which supports the optical system will not introduce an error, because both of the optical systems shown have the same basic characteristics and are connected rigidly by the ship's structure 10. Although mere deviation of the scanning system upon angular deviation of the structure 10 will not result in a phase shift, the field of view of the optical systems must be sufficiently large to accommodate any normally expected rotation of the scanner system, so that the images reflected from mirrors 16 and 16a will not fail to be focused on the photocells 18 and 18a. In the above regard, it is to be noted that an advantage of the structure of Figure 6 is that the field of view is increased when the optical system is arranged midway between the two platforms 11 and 11a. By dividing the distance in half, the field of view of the optical system is doubled.

Another application of the scanner principle described is illustrated in Figure 7 where a large number of platforms 11a through 11d must be aligned with respect to one master platform 11. The arrangement is similar to that illustrated in Figure 6, but includes a number of optical systems associated with a common light source 12 and drum 43. Master platform 11 containing mirror 16 is coordinated with photocell 18 as described above, the photocell 18 being electrically connected by amplifier 55 with each of the phase meters shown which are indicated by the numerals 56a through 56d. Each phase meter 56a through 56d is energized by one of each of the amplifiers 58a through 58d, corresponding to amplifier 58 of Figure 6, in accordance with the energizing of photocells 18a through 18d respectively. As described above, photocell 18 receives light pulses reflected from mirror 16 via the optical system including semi-reflector 13, collimating lens 15, and focusing lens 17. The optical systems associated with photoelectric cells 18a through 18d have correspondingly numbered parts distinguished by the letters a through d respectively. The associated optical and electrical system for each mirror operates in the manner of the electro-optical system associated with mirror 16 of Figure 6, so that any relative angular shifting between mirror 16 of Figure 7 and any of mirrors 16a—16d is detected as a phase shift by the corresponding phase meters 56a—56d.

With the multiple scanner of Figure 7, it is feasible to compare the positions of platforms 11a—11d simultaneously with master platform 11. Also where desired, a single phase meter arranged to receive the pulses from cell 18 can be employed with suitable switch means for selectively connecting the pulses from each photocell 18a—18d with the single phase meter. With such an arrangement, the alignment of the several platforms with master platform 11 must necessarily be performed successfully. Likewise as in Figures 5 and 6, each of the phase meters 56a through 56d of Figure 7 may be operatively connected with the platforms 11a through 11d respectively to accomplish automatic adjustment of their positions.

Up to this point an electro-optical transmission system has been considered of the type wherein the optical system is used only to monitor angular deviation from a predetermined standard, resulting as for example, by a ship's flexure. An alternative arrangement is illustrated in Figure 8 wherein the optical system is mounted on a rigid portion 10 of the ship and is employed as a reference or base line for measurement of the ship's flexure or to maintain two platforms in fixed alignment with respect to each other.

In Figure 8, platforms 65 and 66 are shown, both of which may be gyro-stabilized, or as in the present instance, platform 66 may be a slave of master platform 65. Each of the platforms 65 and 66 is rotatable about its vertical axis and alignment about this axis only is described, although it will be apparent that the same arrangement can be used for aligning the platforms with respect to each other about their other orthogonal axes, as can also be readily accomplished in the structures described in regard to Figures 1–7.

The platforms 65 and 66 are provided with a synchro electrical transmission system comprising a transmitter on platform 65 and a receiver on platform 66. The transmitter comprises a stator 67 and a rotor 68. The receiver comprises a rotor 69 and a stator 70. Both stators are rigidly secured to their respective platforms 65 and 66. The rotors 68 and 69 are operatively connected with servo motors or phase meters 71 and 72 respectively to be turned thereby. Rigidly connected with the rotors 68 and 69 respectively are mirrors 73 and 74.

Mirror 73 is in the optical system mounted on structure 10 comprising semi-reflecting mirror 75 which reflects light pulses from the slotted drum 43 to collimating lens 76 and mirror 73, from which the light pulses are reflected back through lens 75 and focusing lens 77 to photoelectric cell 78. The electrical pulses of the latter are transmitted through coupling amplifier 79 and thence to one winding of each of the servo motors 71 and 72. A second photoelectric cell 80 is arranged adjacent drum 43 to receive light pulses therefrom, thereby to transmit electrical reference pulses through coupling amplifier 81 to the other winding of motor 71.

Mirror 74 receives light pulses from the drum 43 by means of the optical system including the semi-reflecting mirror 82 and collimating lens 83. From mirror 74 light pulses are reflected back through focusing lens 84 to photocell 85, whereby electrical pulses are transmitted through coupling amplifier 86 to the other of the windings of motor 72.

The stator 67 is provided with a winding 67a which in the present instance is excited by means of a suitable A.C. power source 87. Rotor 68 carries windings 68a which are connected with the primary windings 88a of phase shifter 88. The secondary windings 88b of phase shifter 88 are connected with the windings 69a carried by rotor 69. Windings 70a of stator 70 are connected through coupling amplifier 89 to the stator windings of servo motor 90, which in turn is operatively connected with platforms 66 to rotate the latter.

By virtue of the foregoing construction, the optical system 75, 76, and 77 cooperates with mirror 73 and photocell 78 in the manner that the corresponding elements 13, 15, and 17 of Figures 1–7 cooperate with mirror 16 and photocell 18. Electrical pulses transmitted through amplifier 79 are received by the phase meter or motor 71 and are compared with the reference pulses received via amplifier 81. Any phase differential between the pulses received from amplifiers 79 and 81 causes angular adjustment of the rotor winding of motor 71, which in turn is operably connected with the rotor wheel 71a in driving engagement with rotor 68 to control the position of the latter and of mirror 73 with respect to the fixed portion 10 of the ship.

The optical system 82, 83, and 84 similarly cooperates with mirror 74 and photocell 85, so that pulses received by phase meter or motor 72 from amplifier 86 are also compared with the pulses received from amplifier 79, thereby to cause angular adjustment of the rotor windings of motor 72 in accordance with any phase differential between the latter two sets of pulses. In consequence, rotor wheel 72a in driving engagement wtih rotor 69 is adjusted angularly to maintain mirror 74 in predetermined alignment with respect to mirror 73.

Likewise relative rotational movement of mirror 73 and rotor 68 with respect to stator 67 transmits a potential phase shift through the phase adjuster 88 to the windings of rotor 69 and thence through the stator windings 70a to the stator windings of motor 90 via amplifier 89. The rotor windings of motor 90 are thus energized to adjust the angular position of the connected rotor wheel 90a which is in driving engagement with platform 66.

In operation of the structure illustrated in Figure 8, any deviation of either mirror 73 or 74 from a predetermined reference position of alignment with respect to the rigid portion 10 of the ship will energize the associated phase meter 71 or 72 to effect readjustment of the mirror to its reference position. Thus the optical system serves as a base line by which the mirrors 73 and 74 are maintained in predetermined alignment with respect to each other. Any angular adjustment of master platform 65 with respect to mirror 73 will give rise to a phase differential between the transmitting windings 67a and 68a, which is detected by the receiving windings 69a and 70a, whereby motor 90 is energized to effect angular adjustment of slave platform 66 with respect to its mirror 74 until the angular adjustment between windings 69a and 70a equals the aforesaid angular adjustment between windings 67a and 68a. Platform 66 will thus be maintained in a predetermined angular position of adjustment with respect to platform 65. By suitably adjusting the relative angular positions of windings 88a and 88b of the phase adjuster 88, which can be accomplished manually, any desired relative angular positioning of platform 66 with respect to platform 65 can be readily preset.

Having thus described my invention, I claim:

1. In combination with a pair of relatively rotatable spaced members, an electro-optical system for monitoring the relative angular displacement between said members comprising means for transmitting a succession of electrical reference pulses, reflecting means secured to one of said members to move therewith, optical scanning means on the other member for successively scanning said reflecting means with a beam of light at a scanning frequency synchronized with said reference pulses, photoelectric means arranged on said other member to receive said beam of light reflected from said reflecting means in a given time relationship with respect to said reference pulses when said members are in a predetermined position of angular alignment with respect to each other and to receive said beam in a leading or lagging time relationship with respect to said given time relationship upon relative angular deflection of said members in one direction or the opposite from said predetermined position of alignment, said photoelectric means being responsive to said beam reflected thereto to transmit a succession of electrical pulses corresponding in frequency to said scanning frequency, and means responsive to the phase differential between the last-named and reference pulses for monitoring said leading or lagging time relationship.

2. The combination in an electro-optical system according to claim 1 wherein said means for transmitting said reference pulses comprises a second photoelectric means associated with said scanning means to receive said beam therefrom successively in synchronism with said scanning frequency.

3. The combination in an electro-optical system according to claim 1 wherein the last-named means comprises a multiple-phase motor, operatively connected with one of said members to adjust the angular position thereof in accordance with said leading or lagging time relationship to maintain said predetermined position of alignment.

4. In an electro-optical system for monitoring the relative angular displacement between two members, means for transmitting a succession of electrical reference pulses, reflecting means secured to one of said members to move therewith, optical scanning means on the other member for successively scanning said reflecting means with a beam of light at a scanning frequency synchronized with said reference pulses, photoelectric means arranged to receive said beam of light reflected from said reflecting means in a given time relationship with respect to said reference pulses when said members are in a predetermined position of angular alignment with respect to each other and to receive said beam in a leading or lagging time relationship with respect to said given relationship upon relative angular deflection of said members in one direction or the opposite from said predetermined position of alignment, said photoelectric means being responsive to said beam reflected thereto to transmit a succession of electrical pulses corresponding in frequency to said scanning frequency, means responsive to the phase differential between the last-named and reference pulses for monitoring said leading or lagging time relationship, said optical scanning means comprising a light beam source, a beam divider on the optical axis between the reflecting means and photoelectric means effective to transmit said beam from said source along said axis toward said reflecting means, collimating means on the optical axis between said reflecting means and source effective to transmit said beam in parallel rays to said reflecting means, and means located optically between said collimating means and photoelectric means for focusing said beam, which is reflected from said reflecting means, on said photoelectric means.

5. In an electro-optical system for monitoring the relative angular displacement between two members, means for transmitting a succession of electrical reference pulses, reflecting means secured to one of said members to move therewith, optical scanning means on the other member for successively scanning said reflecting means with a beam of light at a scanning frequency synchronized with said reference pulses, photoelectric means arranged to receive said beam of light reflected from said reflecting means in a given time relationship with respect to said reference pulses when said members are in a predetermined position of angular alignment with respect to each other and to receive said beam in a leading or lagging time relationship with respect to said given time relationship upon relative angular deflection of said members in one direction or the opposite from said predetermined position of alignment, said photoelectric means being responsive to said beam reflected thereto to transmit a succession of electrical pulses corresponding in frequency to said scanning frequency, means responsive to the phase differential between the last-named and reference pulses for monitoring said leading or lagging time relationship, said optical scanning means comprising a light beam source rotatable about an axis parallel to the axis of said relative angular displacement, a beam divider on the optical axis between the reflecting means and photoelectric means effective to transmit said beam from said source along said axis toward said reflecting means, collimating means on the optical axis between said reflecting means and source effective to transmit said beam in parallel rays to said reflecting means, and means located optically between said collimating means and photoelectric means for focusing said beam, which is reflected from said reflecting means, on said photoelectric means.

6. In an electro-optical system for monitoring the relative angular displacement between two members, means for transmitting a succession of electrical reference pulses, reflecting means secured to one of said members to move therewith, optical scanning means on the other members for successively scanning said reflecting means with a beam of light at a scanning frequency synchronized with said reference pulses, photoelectric means arranged to receive said beam of light reflected from said reflecting means in a given time relationship with respect to said reference pulses when said members are in a predetermined position of angular alignment with respect to each other and to receive said beam in a leading or lagging time relationship with respect to said given time relationship upon relative angular deflection of said members in one direction or the opposite from said predetermined position of alignment, said photoelectric means being responsive to said beam reflected thereto to transmit a succession of electrical pulses corresponding in frequency to said scanning frequency, means responsive to the phase differential between the last-named and reference pulses for monitoring said leading or lagging time relationship, said optical scanning means comprising a light source, apertured means for successively interrupting said light source, said apertured means being movable transversely to both the optical axis between said source and reflecting means and the axis of said relative angular displacement, a beam divider on the optical axis between the reflecting means and photoelectric means effective to transmit said beam from said source along said axis toward said reflecting means, collimating means on the optical axis between said reflecting means and source effective to transmit said beam in parallel rays to said reflecting means, and means located optically between said collimating means and photoelectric means for focusing said beam, which is reflected from said reflecting means, on said photoelectric means.

7. In combination with a pair of relatively rotatable spaced members, an electro-optical system for monitoring the relative angular displacement between said members comprising means for transmitting a succession of electrical reference pulses, reflecting means secured to one of said members to move therewith, optical scanning means on the other member for successively scanning said reflecting means with a beam of light moving transversely to the axis of said relative angular displacement and having a scanning frequency synchronized with said reference pulses, photoelectric means arranged on said other member to receive said beam of light reflected from said reflecting means in a time relationship with respect to said reference pulses predetermined by the position of angular alignment of said members with respect to each other, photoelectric means being responsive to said beam reflected thereto to transmit a succession of electrical pulses corresponding in frequency to said scanning frequency, said optical scanning means including means for collimating said beam as it is directed to said reflecting means and also including means for focusing said beam as it is directed to said photoelectric means, and means responsive to the phase differential between the last-named and reference pulses for monitoring said leading or lagging time relationship.

8. In an electro-optical system for monitoring the relative angular displacement between two members, separate reflecting means secured to each of said members to move therewith, optical scanning means mounted on a support and being effective to scan each reflecting means successively with a beam of light at a given scanning frequency, separate photoelectric means associated with each reflecting means, each photoelectric means being arranged to receive the beam reflected from its associated reflecting means in a given time relationship with respect to the time that the other photoelectric means receives its beam from its associated reflecting means when the two reflecting means are in a predetermined position of angular alignment with respect to each other and to receive said beam in a leading or lagging time relationship with respect to said given time relationship upon relative angular movement between said reflecting means in one direction or the opposite from said predetermined position of alignment, each photoelectric means being responsive to the beam reflected thereto to transmit a succession of electrical pulses corresponding in frequency to said scanning frequency, and means responsive to the phase differential between the electrical pulses from the two photoelectric means for monitoring said leading or lagging time relationship.

9. In an electro-optical system for monitoring the relative angular displacement between two members, separate reflecting means secured to each of said members to move therewith, optical scanning means mounted on a support and being effective to scan each reflecting means successively with a beam of light at a given scanning frequency, separate photoelectric means associated with each reflecting means, each photoelectric means being arranged to receive the beam reflected from its associated reflecting means in a given time relationship with respect to said scanning frequency when the associated reflecting means is at a predetermined position of angular alignment with respect to said support and to receive the latter beam in a leading or lagging time relationship with respect to said given time relationship upon relative angular deflection of said associated reflecting means in one direction or the opposite from said predetermined position of alignment, each photoelectric means being responsive to the beam reflected thereto to transmit a succession of electrical pulses corresponding in frequency to said scanning frequency, and means responsive to the phase differential between the electrical pulses from the two photoelectric means for monitoring relative angular displacement between said two members.

10. In an electro-optical system for monitoring the relative angular displacement between two members, separate reflecting means secured to each of said members to move therewith, optical scanning means mounted on a support and being effective to scan each reflecting means successively with a beam of light at a given scanning frequency, separate photoelectric means associated with each reflecting means, each photoelectric means being arranged to receive the beam reflected from its associated reflecting means in a given time relationship with respect to said scanning frequency when the associated reflecting means is at a predetermined position of angular alignment with respect to said support and to receive the latter beam in a leading or lagging time relationship with respect to said given time relationship upon relative angular deflection of said associated reflecting means in one direction or the opposite from said predetermined position of alignment, each photoelectric means being responsive to the beam reflected thereto to transmit a succession of electrical pulses corresponding in frequency to said scanning frequency, and a phase meter for measuring the phase differential between the electrical pulses from the two photoelectric means.

11. The combination in an electro-optical system according to claim 10 wherein said phase meter comprises a multiple-phase motor.

12. The combination in an electro-optical system according to claim 10 wherein said phase meter comprises a multiple-phase motor operatively connected with one of said members to adjust the angular position thereof in accordance with said phase differential to maintain said predetermined position of alignment between said two members.

13. In an electro-optical system for monitoring the relative angular displacement between two members, separate reflecting means secured to each of said members to move therewith, optical scanning means mounted on a support and being effective to scan each reflecting means successively with a beam of light at a given scanning frequency, separate photoelectric means associated with each reflecting means, each photoelectric means being arranged to receive the beam reflected from its associated reflecting means in a given time relationship with respect to said scanning frequency when the associated reflecting means is at a predetermined position of angular alignment with respect to said support and to receive the latter beam in a leading or lagging time relationship with respect to said given time relationship upon relative angular deflection of said associated reflecting means in one direction or the opposite from said predetermined position of alignment, each photoelectric means being responsive to the beam reflected thereto to transmit a succession of electrical pulses corresponding in frequency to said scanning frequency, means for detecting the phase differential between the electrical pulses from the two photoelectric means, said optical scanning means comprising a source of said light beam, a beam divider on the optical axis between each reflecting means and associated photoelectric means effective to reflect the light beam from said source to said reflecting means, collimating means on the optical axis between each reflecting means and said source effective to transmit said beam in parallel rays to said reflecting means, and means on the first-named optical axis at a location optically between each collimating means and associated photoelectric means for focusing said beam, which is reflected from said reflecting means, on said photoelectric means.

14. In combination with a plurality of members including a master member, electro-optical means for monitoring the relative angular displacement between each member and said master member comprising separate reflecting means attached to each member to move as a unit therewith, optical scanning means associated with each reflecting means and mounted on a reference support, said scanning means being effective to scan each reflecting means successively with a beam of light at a scanning frequency synchronized with the frequency at which each of the other reflecting means is scanned, separate photoelectric means associated with each reflecting means to receive the beam reflected therefrom in a given time relationship with respect to said scanning frequency when the associated reflecting means is at a predetermined angular position of alignment with respect to said reference support and to receive said beam in a leading or lagging time relationship with respect to said given time relationship upon relative angular displacement of said associated reflecting means in one direction or the opposite from said predetermined position of alignment, each photoelectric means being responsive to the beam reflected thereto to transmit a succession of electrical pulses corresponding in frequency to said scanning frequency, and electrical means for monitoring the phase differential between the electrical pulses from the photoelectric means, which receives the light beam from the reflecting means attached to said master member, and the electrical pulses from each of the other photoelectric means.

15. The combination according to claim 14 wherein separate optical scanning means is associated with each reflecting means, each scanning means comprising a light beam source, a beam divider on the optical axis between each reflecting means and its associated photoelectric means effective to reflect said beam from said source along said axis to said reflecting means, collimating means on the optical axis between each reflecting means and said source effective to transmit said beam in parallel rays to the reflecting means, and means on the first-named optical axis at a location between each collimating means and photoelectric means for focusing said beam, which is reflected from the reflecting means, on said photoelectric means.

16. In a device for monitoring the relative angular displacement between two members, a reflector rotatably mounted on each member, means for transmitting a succession of electrical reference pulses, optical scanning means mounted on a support optically intermediate said reflectors for successively scanning each reflector with a light beam at a scanning frequency synchronized with said reference pulses, a pair of photoelectric means mounted on said support, one being associated with one of said reflectors and arranged to receive said light beam reflected therefrom in a given time relationship with respect to said reference pulses when said one reflector is at a predetermined angular position of alignment with respect to said support and to receive said light beam in leading or lagging time relationship with respect to said given time relationship upon relative angular deflection of said one reflector in one direction or the oppostie from said predetermined angular position, the other photoelectric means being associated with the other reflector and arranged to receive said light beam reflected therefrom in a given time relationship with respect to the light beam received by said one photoelectric means when the two reflectors are in a predetermined position of angular alignment with respect to each other and to receive said light beam in leading or lagging time relationship with respect to the last-named given time relationship upon relative angular deflection in one direction or the opposite between the two reflectors from their aforesaid predetermined position of angular alignment with respect to each other, each photoelectric means being responsive to the light beam reflected thereto to transmit a succession of electrical pulses corresponding in frequency to the scanning frequency, means responsive to the phase differential between said reference pulses and the pulses from said one photoelectric means for maintaining said one reflector at its aforesaid predetermined position of angular alignment with respect to said support, means responsive to the phase differential between the pulses from the two photoelectric means for adjusting the angular position of said other reflector to maintain said reflectors in their aforesaid predetermined position of angular alignment with respect to each other, and electrical synchronizing means operatively connected with said members and reflectors for controlling the relative angular displacement between said other reflector and associated member in accordance with the relative angular displacement between said one reflector and associated member.

17. In a device for monitoring the relative angular displacement between two members, an electrical transmission system operatively connecting said members comprising a receiving and a transmitting stator fixed with respect to one and the other of said members respectively and also comprising a receiving and a transmitting rotor associated with the receiving and transmitting stators respectively, electrical circuit means operatively connecting said receiving and transmitting stators and rotors for transmitting an electrical signal to said receiving stator upon relative angular displacement between either stator and its associated rotor with respect to relative angular displacement between the other stator and associated rotor, means responsive to said signal and operatively connected with said one member for rotating the same to maintain the relative angular displacement between said receiving rotor and stator corresponding to the relative angular displacement between said transmitting rotor and stator, a pair of reflectors mounted on said rotors respectively to rotate therewith, means for transmitting electrical reference pulses, optical scanning means for scanning each reflector with a succession of light pulses at a frequency synchronized with said reference pulses, photoelectric means associated with said reflectors to receive said light pulses reflected therefrom in time relationships with respect to said reference pulses predetermined by the angular positions of said reflectors, and means responsive to the phase relationships between said reference pulses and the reflected light pulses received by said photoelectric means for monitoring the angular relationship between said rotors.

18. In a device for monitoring the relative angular displacement between two members, an electrical transmission system operatively connecting said members comprising a receiving and a transmitting stator fixed with respect to one and the other of said members respectively and also comprising a receiving and a transmitting rotor associated with the receiving and transmitting stators respectively, electrical circuit means operatively connecting said receiving and transmitting stators and rotors for transmitting an electrical signal to said receiving stator upon relative angular displacement between either stator and its associated rotor with respect to relative angular displacement between the other stator and associated rotor, means responsive to said signal and operatively connected with said one member for rotating the same to maintain the relative angular displacement between said receiving rotor and stator corresponding to the relative angular displacement between said transmitting rotor and stator, receiving and transmitting reflectors mounted on said receiving and transmitting rotors respectively to rotate therewith, means for transmitting electrical reference pulses, optical scanning means mounted for successively scanning each reflector with a beam of light at a scanning frequency synchronized with said reference pulses, photoelectric means associated with said transmitting reflector and arranged to receive said light beam reflected therefrom in a given time relationship with respect to said reference pulses, when the latter reflector and associated photoelectric means are in a predetermined position of angular alignment with respect to each other, and to receive said beam in a leading or lagging time relationship with respect to said given time relationship upon relative deflection of said reflecting means angularly in one direction or the opposite from said predetermined position of alignment, second photoelectric means associated with said receiving reflector and arranged to receive said light beam reflected therefrom in a given time relationship with respect to the light beam reflected to said first-named photoelectric means when the two reflectors are in a predetermined position of angular alignment with respect to each other and to receive the light beam reflected from said receiving reflector in a leading or lagging time relationship with respect to the last-named given time relationship upon relative angular deflection in one direction or the opposite between said two reflectors from their aforesaid predetermined position of angular alignment with respect to each other, each photoelectric means being responsive to the beam reflected thereto to transmit a succession of electrical pulses corresponding in frequency to the scanning frequency, means responsive to the phase differential between said reference pulses and the pulses from the first-named photoelectric means for rotating said transmitting rotor to position said transmitting reflector in its aforesaid predetermined position of alignment with respect to its associated photoelectric means, and means responsive to the phase differential between the pulses from the two photoelectric means for rotating said receiving rotor to position said receiving reflector in its aforesaid predetermined position of alignment with respect to said transmitting reflector.

19. In a device for monitoring the relative angular displacement between two members, an electrical transmission system operatively connecting said members comprising a receiving and a transmitting stator fixed with respect to one and the other of said members respectively and also comprising a receiving and a transmitting rotor associated with the receiving and transmitting stators respectively, electrical circuit means operatively connecting said receiving and transmitting stators and rotors for transmitting an electrical signal to said receiving stator upon relative angular displacement between either stator and its associated rotor with respect to relative angular displacement between the other stator and associated rotor, means responsive to said signal and operatively connected with said one member for rotating the same to maintain the relative angular displacement between said receiving rotor and stator corresponding to the relative angular displacement between said transmitting rotor and stator, receiving and transmitting reflectors mounted on said receiving and transmitting rotors respectively to rotate therewith, means for transmitting electrical reference pulses, optical scanning means mounted on a support optically intermediate the two reflectors for successively scanning each reflector with a beam of light at a scanning frequency synchronized with said reference pulses, first and second photoelectric means mounted on said support, said first photoelectric means being associated with said transmitting reflector and being arranged to receive said light beam reflected therefrom in a given time relationship with respect to said reference pulses, when the latter reflector is in a predetermined position of angular alignment with respect to said support, and to receive said beam in a leading or lagging time relationship with respect to said given time relationship upon relative deflection of said reflecting means angularly in one direction or the opposite from said predetermined position of alignment, said second photoelectric means being arranged to receive said light beam reflected from said receiving reflector in a given time relationship with respect to the light beam reflected to said first-named photoelectric means when the two reflectors are in a predetermined position of angular alignment with respect to each other and to receive the light beam reflected from said receiving reflector in a leading or lagging time relationship with respect to the last-named given time relationship upon relative angular deflection in one direction or the opposite between said two reflectors from their aforesaid predetermined position of angular alignment with respect to each other, each photoelectric means being responsive to the beam reflected thereto to transmit a succession of electrical pulses corresponding in frequency to the scanning frequency, means responsive to the phase differential between said reference pulses and the pulses from the first-named photoelectric means for rotating said transmitting rotor to position said transmitting reflector in its aforesaid predetermined position of alignment with respect to said support, and means responsive to the phase differential between the pulses from the two photoelectric means for rotating said receiving rotor to position said receiving reflector in its aforesaid predetermined position of alignment with respect to said transmitting reflector.

20. In an electro-optical system for monitoring the relative angular displacement between two reflecting members relatively rotatable with respect to each other, pulse generating means for emitting electrical reference pulses, optical scanning means for scanning each reflecting member with a succession of light pulses at a frequency synchronized with said reference pulses, photoelectric means associated with said reflecting members to receive said light pulses reflected therefrom and to emit electrical comparison pulses in time relationship with respect to said reference pulses predetermined by the angular positions of said reflecting members, and means associated with said pulse generating and photoelectric means responsive to the phase relationships between said reference and comparison pulses for monitoring the angular relationship between said members.

21. In an electro-optical system for monitoring the relative angular displacement between two reflecting members relatively rotatable with respect to each other, pulse generating means for emitting electrical reference pulses, optical scanning means for scanning each reflecting member with a succession of light pulses at a frequency synchronized with said reference pulses, separate photoelectric means associated with each of said reflecting members to receive said light pulses reflected therefrom and to emit electrical comparison pulses in time relationships with respect to said reference pulses predetermined by the angular positions of said reflecting members, and means associated with said photoelectric and pulse generating means comprising first means responsive to the phase relationship between said reference pulses and the comparison pulses from the photoelectric means associated with one of said members for monitoring the angular position of said one member and also comprising second means cooperable with said first means and being responsive to the phase relationship between said reference pulses and the comparison pulses from the photoelectric means associated with the other of said members for monitoring the angular position of said other member with respect to the angular position of said one member.

22. In an electro-optical system for monitoring the relative angular displacement between two reflecting members relatively rotatable with respect to each other, pulse generating means for emitting electrical reference pulses, a support, optical scanning means on said support for scanning each reflecting member with a succession of light pulses at a frequency synchronized with said reference pulses, separate photoelectric means on said support and associated with each of said reflecting members to receive said light pulses reflected therefrom and to emit electrical comparison pulses in time relationships with respect to said reference pulses predetermined by the angular positions of said reflecting members, and means associated with said photoelectric and pulse generating means comprising first means responsive to the phase relationship between said reference pulses and the comparison pulses from the photoelectric means associated with one of said members for monitoring the angular position of said one member with respect to said support and also comprising second means cooperable with said first means and being responsive to the phase relationship between said reference pulses and the comparison pulses from the photoelectric means associated with the other of said members for monitoring the angular position of said other member with respect to the angular position of said one member.

23. In an electro-optical system for monitoring the relative angular displacement between two reflecting members relatively rotatable with respect to each other, optical scanning means for scanning each reflecting means with a succession of light pulses at a predetermined reference frequency, photoelectric means associated with said reflecting members to receive said light pulses reflected therefrom, thereby to be energized to emit electrical pulses in phase relationship with respect to said reference frequency predetermined by the angular positions of said reflecting members, and means associated with said photoelectric means and being responsive to the phase relationship between the pulses from the two reflecting members for monitoring the angular relationship between said members.

24. In an electro-optical system for monitoring the relative angular displacement between two reflecting members relatively rotatable with respect to each other, a support, optical scanning means on said support for scanning each reflecting means with a succession of light pulses at a predetermined reference frequency, separate photoelectric means on said support associated with each of said reflecting members to receive said light pulses reflected therefrom, thereby to be energized to emit electrical pulses in phase relationships with respect to said reference frequency predetermined by the angular positions of said reflecting members, and means associated with said photoelectric means and being responsive to the phase relationship between the pulses from the two reflecting members for monitoring the angular relationship between said members.

References Cited in the file of this patent

UNITED STATES PATENTS

| | | |
|---|---|---|
| Re. 21,806 | Johnson | May 20, 1941 |
| 2,462,925 | Varian | Mar. 1, 1949 |
| 2,515,762 | Dimmick | July 18, 1950 |

UNITED STATES PATENT OFFICE
CERTIFICATE OF CORRECTION

Patent No. 2,950,428

August 23, 1960

John G. Gievers

It is hereby certified that error appears in the printed specification of the above numbered patent requiring correction and that the said Letters Patent should read as corrected below.

Column 2, line 31, for "embodment" read -- embodiment --; column 10, line 25, after "given" insert -- time --; column 11, lines 9 and 10, for "members" read -- member --; column 13, line 23, for "reffecting" read -- reflecting --; column 14, line 17, for "oppostie" read -- opposite --; column 16, line 48, strike out "said receiving", second occurrence.

Signed and sealed this 4th day of April 1961.

(SEAL)

Attest: ERNEST W. SWIDER

Attesting Officer

ARTHUR W. CROCKER
Acting Commissioner of Patents